(12) United States Patent
Barsness et al.

(10) Patent No.: US 7,480,643 B2
(45) Date of Patent: Jan. 20, 2009

(54) SYSTEM AND METHOD FOR MIGRATING DATABASES

(75) Inventors: Eric L. Barsness, Pine Island, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 317 days.

(21) Appl. No.: 11/316,245

(22) Filed: Dec. 22, 2005

(65) Prior Publication Data
US 2007/0150488 A1    Jun. 28, 2007

(51) Int. Cl.
G06F 7/00    (2006.01)
(52) U.S. Cl. .................... 707/2; 707/200; 717/168; 717/174
(58) Field of Classification Search .................. 707/100, 707/204, 2
See application file for complete search history.

(56) References Cited

U.S. PATENT DOCUMENTS

| 6,003,022 | A  | * | 12/1999 | Eberhard et al. ............... | 707/2   |
| 6,286,137 | B1 | * | 9/2001  | Bleizeffer et al. ............. | 717/127 |
| 7,155,463 | B1 | * | 12/2006 | Wang et al. .................. | 707/204 |
| 2004/0068722 | A1 | * | 4/2004 | Amodio et al. ............... | 717/169 |
| 2005/0262060 | A1 | * | 11/2005 | Rohwedder et al. ............ | 707/3   |

OTHER PUBLICATIONS

Author: IBM Title: Siebel 7 Using DB2 UDB V7.x Planning & Installation Guide for AIX/Win2K Date: Apr. 2002 Publisher: IBM p. i-xiv; Chapter 6 pp. 131-158;pp. 190-210; pp. 245-256.*
Author: SETI@Home Title: SETI@Home Technical news reports—2002 Date: Nov. 15, 2002 Publisher: SETI University of California, Berkeley Page http://seticlassic.ssl.berkeley.edu/tech_news02.html.*
Author: William Laurent Title: Best Practices for Data Warehouse Database Developers Date: Dec. 1, 2001 Publisher: DM Review Magazine Page http://www.dmreview.com/issues/20011201/4340-1.html.*
SETI@Home; Technical News Reports; Nov. 15, 2002.
Laurent; Best Practices for Data Warehouse Database Developers; Dec. 2001.

* cited by examiner

*Primary Examiner*—Mohammad Ali
*Assistant Examiner*—Anh Tai V Tran
(74) *Attorney, Agent, or Firm*—Patterson & Sheridan, LLP (57) ABSTRACT

A method, system and article of manufacture for migration of databases and, more particularly, for optimizing migration of a database from a source system to a target system. One embodiment provides a computer-implemented method for optimizing migration of a database from a source system to a target system. The method comprises collecting source parameters related to performance characteristics for the database on the source system. On the basis of the collected source parameters and target parameters of the target system database configuration information is generated. The target parameters will affect the operation of the database on the target system as compared to the operation of the database on the source system. The database configuration information is applicable to tune the database to operate on the target system. The method further comprises configuring the database to run on the target system according to the database configuration information.

4 Claims, 6 Drawing Sheets

SYSTEM AND METHOD FOR MIGRATING DATABASES

BACKGROUND OF THE INVENTION

1. Field of the Invention

The present invention generally relates to migration of databases and, more particularly, to optimizing migration of a database from a source system to a target system.

2. Description of the Related Art

Databases are computerized information storage and retrieval systems that are generally implemented as software products on associated computer systems. For various reasons, it may be desirable to migrate databases from source computer systems to target computer systems. In this context, the term "migrating" designates the process of moving the database from a source system to a target system. For instance, a given database may be migrated from a first system to a second system so that a broader range of users may simultaneously access the data in the database.

Various database products provide migration aides which are configured to generate a script on a given source system that can then be processed on a corresponding target system. By way of example, the eServer iSeries computer system available from International Business Machines of Armonk, N.Y., provides such a script using a SAVLIB command on the source system. Then, using a RSTLIB command, the script can be executed on the corresponding target system, whereby the database is restored on the target system.

However, when migrating a database from a source system to a target system, the target system often has characteristics that differ from the characteristics of the source system. These differences may affect execution of the database on the target system. For instance, the target system may have a different central processing unit, different disk drives and a different input/output configuration. Accordingly, a database that is optimized for running on the source system may not be optimized for running on the target system. To optimize the migrated database an administrator must then go through the tedious process of tuning the database on the target system.

Therefore, there is a need for an efficient technique for migrating a database from a source system to a target system.

SUMMARY OF THE INVENTION

The present invention is generally directed to a method, system and article of manufacture for migration of databases and, more particularly, for optimizing migration of a database from a source system to a target system.

One embodiment provides a computer-implemented method for optimizing migration of a database from a source system to a target system. The method comprises collecting source parameters related to performance characteristics for the database on the source system. On the basis of the collected source parameters and target parameters of the target system database configuration information is generated. The target parameters will affect the operation of the database on the target system as compared to the operation of the database on the source system. The database configuration information is applicable to tune the database to operate on the target system. The method further comprises configuring the database to run on the target system according to the database configuration information.

Another embodiment provides a computer-readable medium having a program stored thereon which, when executed, performs operations for optimizing migration of a database from a source system to a target system. The operations comprise receiving source parameters related to performance characteristics for the database on the source system. On the basis of the collected source parameters and target parameters of the target system, database configuration information is generated. The target parameters will affect the operation of the database on the target system as compared to the operation of the database on the source system. The database configuration information is applicable to tune the database to operate on the target system.

Still another embodiment provides a data processing system comprising a source system having a database, a target system, and a detection/restoration component for optimizing migration of the database from the source system to the target system. The detection/restoration component is configured to: (i) collect source parameters related to performance characteristics for the database on the source system; (ii) generate database configuration information on the basis of the collected source parameters and target parameters of the target system, wherein the target parameters will affect the operation of the database on the target system as compared to the operation of the database on the source system; and wherein the database configuration information is applicable to tune the database to operate on the target system; and (iii) configure the database to run on the target system according to the database configuration information.

Yet another embodiment provides a computer-implemented method for optimizing migration of a database from a source system to a target system. The method comprises collecting source parameters related to performance characteristics for the database on the source system. The method further comprises restoring the database on the target system according at least to the source parameters; wherein the restoring accounts for a difference in operating characteristics between the source system and the target system.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Introduction

The present invention is generally directed to a method, system and article of manufacture for optimizing migration of a database from a source system to a target system. In this context, the term "migrating" designates the process of moving a database from a source system to a target system and illustratively includes (but is not limited to) copying, replicating, mirroring and exporting a database.

In one embodiment, migration of a database from a source system to a target system is optimized by gathering vital system information from the source system that is suitable for tuning the database for operation on the target system. The vital source system information is compared to corresponding target system information that is retrieved from the target system. Thus, differences between running the database on the source system and the target system can be identified and advantageously employed to tune the database on the target system.

More specifically, in one embodiment source parameters related to performance characteristics for the database on the source system are collected. By way of example, such source parameters include machine configuration information, plan cache data and performance data, which are related to operation of the database on the source system. The collected source parameters are used to generate database configuration information that is applicable to tune the database to operate on the target system. The database configuration information is generated with respect to target parameters of the target system that will affect the operation of the database on the target system as compared to the operation of the database on the source system. Then, the database is configured on the target system using the database configuration information to optimize operation of the database on the target system.

Preferred Embodiments

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and, unless explicitly present, are not considered elements or limitations of the appended claims.

One embodiment of the invention is implemented as a program product for use with a computer system such as, for example, computer system 110 shown in FIG. 1 and described below. The program(s) of the program product defines functions of the embodiments (including the methods described herein) and can be contained on a variety of computer-readable media. Illustrative computer-readable media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information to/from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

An Exemplary Computing Environment

Figure 1:
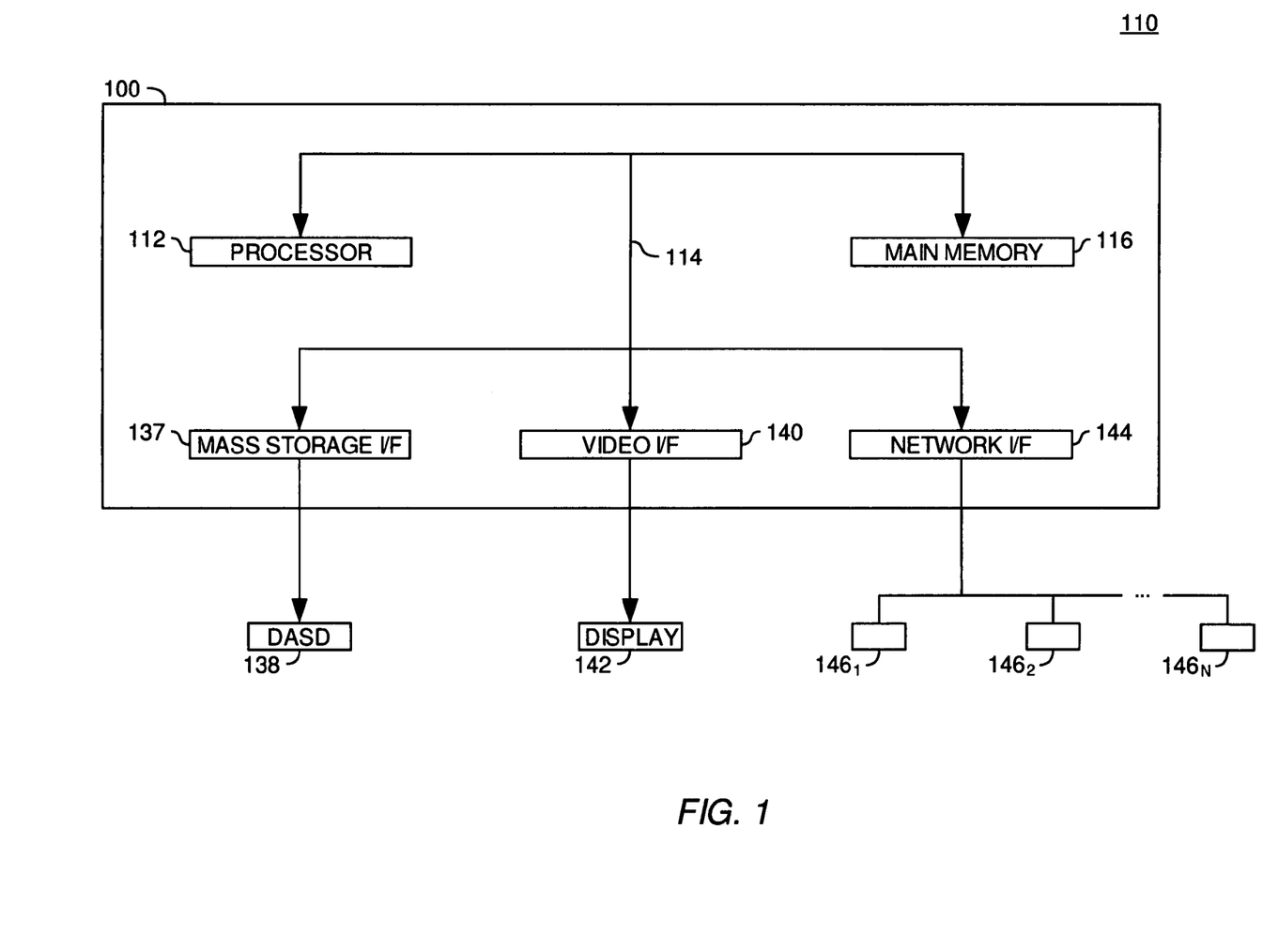
FIG. 1 illustrates a computer system that may be used in accordance with the invention.

FIG. 1 shows a computer 100 (which is part of a computer system 110) that becomes a special-purpose computer according to an embodiment of the invention when configured with the features and functionality described herein. The computer 100 may represent any type of computer, computer system or other programmable electronic device, including a client computer, a server computer, a portable computer, a personal digital assistant (PDA), an embedded controller, a PC-based server, a minicomputer, a midrange computer, a mainframe computer, and other computers adapted to support the methods, apparatus, and article of manufacture of the invention. Illustratively, the computer 100 is part of a networked system 110. In this regard, the invention may be practiced in a distributed computing environment in which tasks are performed by remote processing devices that are linked through a communications network. In a distributed computing environment, program modules may be located in both local and remote memory storage devices. In another embodiment, the computer 100 is a standalone device. For purposes of construing the claims, the term "computer" shall mean any computerized device having at least one processor. The computer may be a standalone device or part of a network in which case the computer may be coupled by communication means (e.g., a local area network or a wide area network) to another device (i.e., another computer).

In any case, it is understood that FIG. 1 is merely one configuration for a computer system. Embodiments of the invention can apply to any comparable configuration, regardless of whether the computer 100 is a complicated multi-user apparatus, a single-user workstation, or a network appliance that does not have non-volatile storage of its own.

The computer 100 could include a number of operators and peripheral systems as shown, for example, by a mass storage interface 137 operably connected to a storage device 138, by a video interface 140 operably connected to a display 142, and by a network interface 144 operably connected to the plurality of networked devices 146 (which may be representative of the Internet) via a suitable network. Although storage 138 is shown as a single unit, it could be any combination of fixed and/or removable storage devices, such as fixed disc drives, floppy disc drives, tape drives, removable memory cards, or optical storage. The display 142 may be any video output device for outputting viewable information.

Computer 100 is shown comprising at least one processor 112, which obtains instructions and data via a bus 114 from a main memory 116. The processor 112 could be any processor adapted to support the methods of the invention. In particular, the computer processor 112 is selected to support the features of the present invention. Illustratively, the processor is a PowerPC® processor available from International Business Machines Corporation of Armonk, N.Y.

The main memory 116 is any memory sufficiently large to hold the necessary programs and data structures. Main memory 116 could be one or a combination of memory devices, including Random Access Memory, nonvolatile or backup memory, (e.g., programmable or Flash memories, read-only memories, etc.). In addition, memory 116 may be considered to include memory physically located elsewhere in the computer system 110, for example, any storage capacity used as virtual memory or stored on a mass storage device (e.g., direct access storage device 138) or on another computer coupled to the computer 100 via bus 114. Thus, main memory 116 and storage device 138 could be part of one virtual address space spanning multiple primary and secondary storage devices.

An Exemplary Database Migration Environment

Figure 2A:
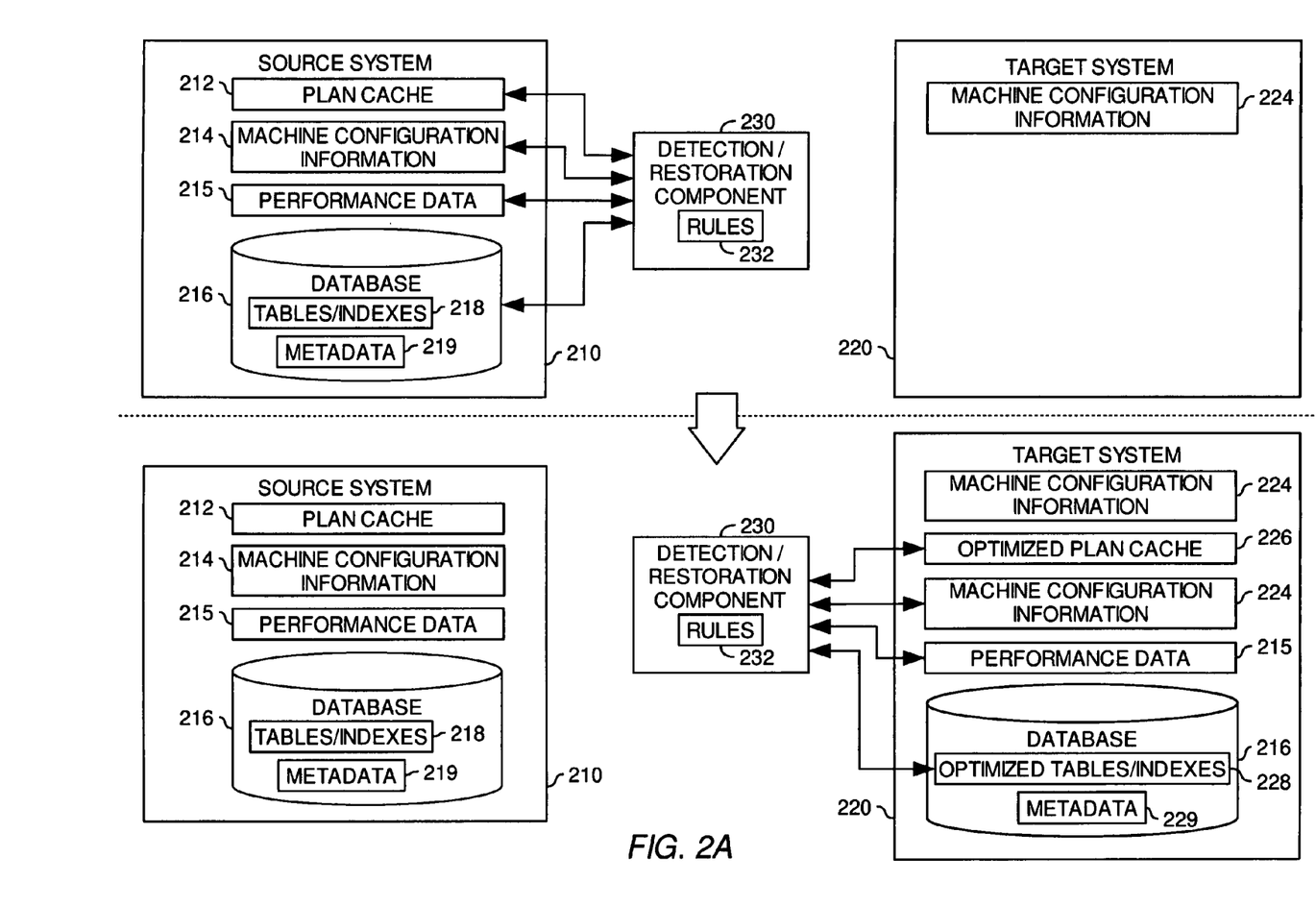
FIG. 2A is a relational view of software components illustrating migration of a database in one embodiment.

Referring now to FIG. 2A, a relational view of software components in one embodiment is illustrated. The software components illustratively include a source system 210, a target system 220 and a detection/restoration component 230.

The source system 210 illustratively includes a database 216 that is migrated from the source system 210 to the target system 220 using the detection/restoration component 230. As noted above, the term "migrating" designates the process of installing the database 216 on the target system 220 independent of whether the database 216 is copied, replicated, mirrored, exported or otherwise moved from the source system 210. An exemplary method of migrating the database 216 from the source system 210 to the target system 220 is described below with reference to FIG. 2B.

Illustratively, the database 216 is shown as a single database, for simplicity. For instance, the database 216 can be a standalone database that is implemented as a single component on the source system 210. Alternatively, the database 216 can be implemented as a distributed database which is dispersed or replicated among different points in a network (e.g., networked devices 146 of FIG. 1).

The database 216 is representative of any collection of data regardless of the particular physical representation of the data. A physical representation of data defines an organizational schema of the data. As used herein, the term "schema" refers to a particular arrangement of the data. By way of example, the database 216 can be implemented as a relational database in which data is defined so that it can be reorganized and accessed in a number of different ways. In other words, the database 216 can be organized according to a relational schema that is accessible by SQL queries. Alternatively, the database 216 can be organized according to an XML schema that is accessible by XML queries. However, the invention is not limited to a particular schema. For instance, the database 216 can also be implemented as an object-oriented programming database which is congruent with the data defined in object classes and subclasses. Accordingly, all such different implementations and data schemas are broadly contemplated, as well as extension to schemas presently unknown.

Illustratively, the database 216 is implemented for storing data in a plurality of tables and indexes 218 which are defined using associated metadata 219. The tables and indexes 218 are organized according to an underlying schema. The metadata 219 defines the physical representation of the data in the tables and indexes 218 on the basis of the underlying schema. To this end, the metadata 219 includes suitable attributes defining properties of the tables and indexes 218. For instance, the metadata 219 includes column descriptions having suitable attributes for columns that are included with the tables of the database 216. Such column descriptions may include data type descriptors for the columns in the tables of the database 216, such as VARCHAR, VARGRAPHIC, CLOB (character large object) or BLOB (binary large object).

Illustratively, the source system 210 further includes a plan cache 212, machine configuration information 214 and performance data 215. The plan cache 212, the machine configuration information 214 and the performance data 215 define source parameters which are related to performance characteristics for the database 216 on the source system 210. Exemplary source parameters are described below. However, it should be noted that the exemplary source parameters are merely described by way of example and not to limit the invention accordingly. Instead, any suitable source parameter, known or unknown, is broadly contemplated.

The plan cache data 212 includes an indication of all queries which were executed against the database 216 on the source system 210. The plan cache data 212 further includes all access plans that have been used for executing the queries against the database 216. A given access plan describes how a given query accesses the database 216 using available access paths (indexes, sequential reads, etc.) with respect to system held statistics on the data to be accessed (the size of the table, the number of distinct values in a particular column, etc.).

The machine configuration information 214 describes key components of the source system 210 that are used by the database 216 for optimization recommendations with respect to query execution. Such key components illustratively include, but are not limited to, applicable processor speed, amount of available disk drives, current input/output configuration, amount of available memory, currently installed components, current program temporary fix (PTF) levels and current software levels of the source system 210. Furthermore, the machine configuration information 214 may include information indicating whether the source system 210 is a 32 or a 64 bit system and so forth.

The performance data 215 includes information that describes operation of the database 216 on the source system 210. The performance data 215 illustratively includes, but is not limited to, information related to previously performed database operations including amounts of used memory, allocated processor resources, required disk accesses and required input/output resources. The performance data 215 may further include any available database related parameters. In one embodiment, such database related parameters include initialization and runtime parameters provided by a corresponding database vendor. Furthermore, such database related parameters may include journal items that are created when committing transactions or rollbacks on the database 216 and/or disk space allocated to such journal items. By way of example, such journal items include (i) replication delays defining required durations for replication of data, (ii) a number of rollback segments defining an amount of memory that is allocated for rollback segments, (iii) recovery parallelism indicating a number of threads that are running to recover from journal, and (iv) a log format defining a format used for associated log files. In other words, the performance data 215 defines historical performance information with respect to database transactions and/or rollbacks.

It should be noted that the source parameters defined by the plan cache 212, the machine configuration information 214 and the performance data 215 may be readily available on the source system 210 or derived from other suitable parameters by the detection/restoration component 230 as required. Furthermore, the plan cache 212, the machine configuration information 214 and the performance data 215 can be retrieved by the detection/restoration component 230 from multiple files, such as log files and/or configuration or parameter files of the source system 210. For instance, different parts of the machine configuration information 215 can be included with different configuration or parameter files. All such possible implementations are broadly contemplated.

In one embodiment, the source parameters are collected by the detection/restoration component 230 for migration of the database 216 to the target system 220. By way of example, prior to migration of the database 216, the target system 220 only includes machine configuration information 224. The machine configuration information 224 includes similar information as the machine configuration information 214 of the source system 210 and is, therefore, not described in more detail.

The detection/restoration component 230 is illustrated as a single component separate from the source system 210 and the target system 220. However, it should be noted that the detection/restoration component 230 is merely described by way of example to illustrate a component which is suitable to implement aspects of the invention. In other words, the functions of the detection/restoration component 230 can be implemented into other functional components. For instance, in one embodiment the functions of the detection/restoration component 230 are implemented by a detection unit implemented by the source system 210 (e.g., an agent resident on the source system 210) and a restoration unit implemented by the target system 220 (e.g., an agent resident on the target system 220). All such implementations are broadly contemplated.

Illustratively, the detection/restoration component 230 includes a multiplicity of rules 232. Each of the rules 232 defines a relationship between a collected source parameter and an action to be performed with respect to a corresponding target parameter that is determined with respect to the target system 220.

In one embodiment, the detection/restoration component 230 prepares migration of the database 216 to the target system 220 by retrieving from the source system 210 all elements that are migrated. More specifically, the detection/restoration component 230 retrieves the database 216, the plan cache 212, the machine configuration information 214 and the performance data 215 from the source system 210. An exemplary method for preparing migration of the database 216 from the source system 210 to the target system 220 is described below with reference to FIG. 3.

The detection/restoration component 230 then restores the retrieved elements on the target system 220 having the machine configuration information 224. Accordingly, the target system 220 includes after restoration of the retrieved elements also the plan cache 212, the machine configuration information 214, the performance data 215 and the database 216. An exemplary method of restoring the retrieved components on the target system 220 is described below with reference to FIG. 4.

In one embodiment, restoring the retrieved elements on the target system 220 includes optimizing the restored plan cache 212 on the basis of the rules 232. Accordingly, the target system 220 illustratively includes an optimized plan cache 226 which is generated from the restored plan cache 212. An exemplary method of optimizing a restored plan cache is described below with reference to FIG. 5.

Moreover, restoring the retrieved elements on the target system 220 includes in one embodiment optimizing the restored tables and indexes of the database 216 on the basis of the rules 232. Accordingly, the restored database 216 of the target system 220 illustratively includes optimized tables and indexes 228 and associated metadata 229, which are generated on the basis of the restored tables and indexes 218 and the restored metadata 219. An exemplary method of optimizing restored tables and indexes is described below with reference to FIG. 6.

Migrating a Database from a Source System to a Target System

Figure 2B:
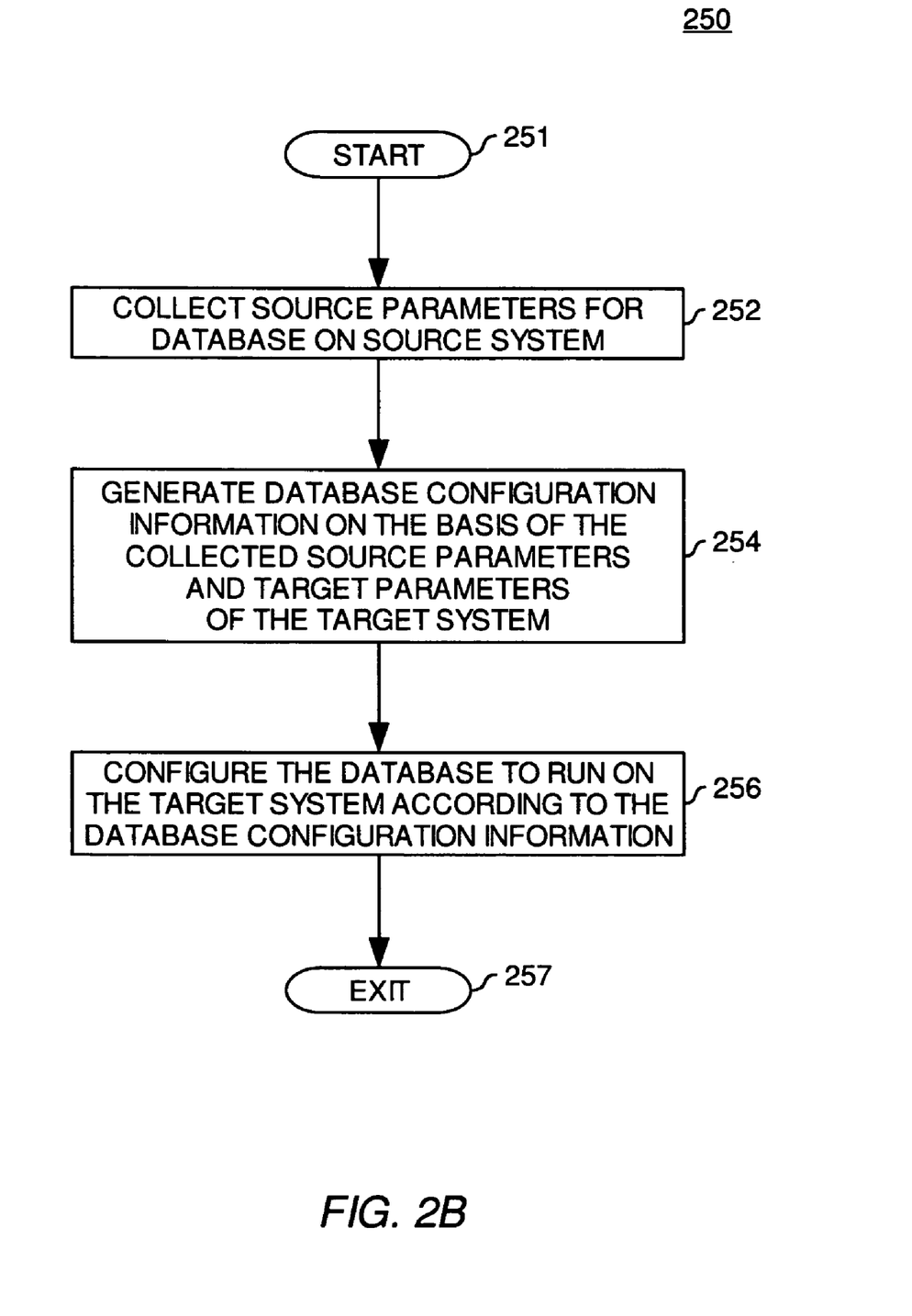
FIG. 2B is a flow chart illustrating the operation of a detection/restoration component in one embodiment.

Referring now to FIG. 2B, one embodiment of a method 250 for managing migration of a database (e.g., database 216 of FIG. 2A) from a source system (e.g., source system 210 of FIG. 2A) to a target system (e.g., target system 220 of FIG. 2A) is illustrated. In one embodiment, at least part of the steps of the method 250 is performed by the detection/restoration component 230 of FIG. 2A. Method 250 starts at step 251.

At step 252, source parameters related to performance characteristics for the database are collected on the source system. More specifically, a plan cache (e.g., plan cache 212 of FIG. 2A), machine configuration information (e.g., machine configuration information 214 of FIG. 2A) and performance data (e.g., performance data 215 of FIG. 2A) are retrieved on the source system. An exemplary method of retrieving the source parameters from the source system is described below with reference to FIG. 3.

At step 254, database configuration information is generated that is applicable to tune the database to operate on the target system. In one embodiment, the database configuration information is generated by applying suitable rules (e.g., rules 232 of FIG. 2A) to the collected source parameters and target parameters of the target system. The target parameters are parameters that correspond to respective source parameters. Thus, the target parameters will affect the operation of the database on the target system as compared to the operation of the database on the source system. In one embodiment, the suitable rules are also applied to metadata (e.g., metadata 219 of FIG. 2A) of the database in order to optimize the physical representation of the data in the database.

For instance, assume that the machine configuration information of the source system indicates that the source system has a disk storage capacity of 100 GB. Assume further that the target system has a disk storage capacity of 100 TB. In this case, a suitable rule may define a recommended action that consists in changing a corresponding target parameter to optimize operation of the database on the target system. By way of example, assume that the parameter is the disk space allocated to journal items for the database. As the disk storage capacity of the target system is one thousand times greater than the disk storage capacity of the source system, the suitable rule may indicate that the disk space for the journal items should be increased proportionally to the increase in disk storage capacity from the source system to the target system. In one embodiment, the recommended action is included with the database configuration information. Accordingly, the database configuration information may define a list of recommended actions to be performed on the target system to tune the database for operation on the target system.

At step 256, the database is configured to run on the target system. More specifically, the database is installed on the target system and the retrieved source parameters are restored on the target system. Then, the database is tuned in order to optimize operation of the database on the target system. An exemplary method of installing and configuring the database on the target system is described below with reference to FIG. 4.

In one embodiment, the database is automatically tuned by performing the recommended actions according to the database configuration information. Alternatively, the recommended actions are presented to a database administrator who may perform the actions as desired. Method 250 then exits at step 257.

Figure 3:
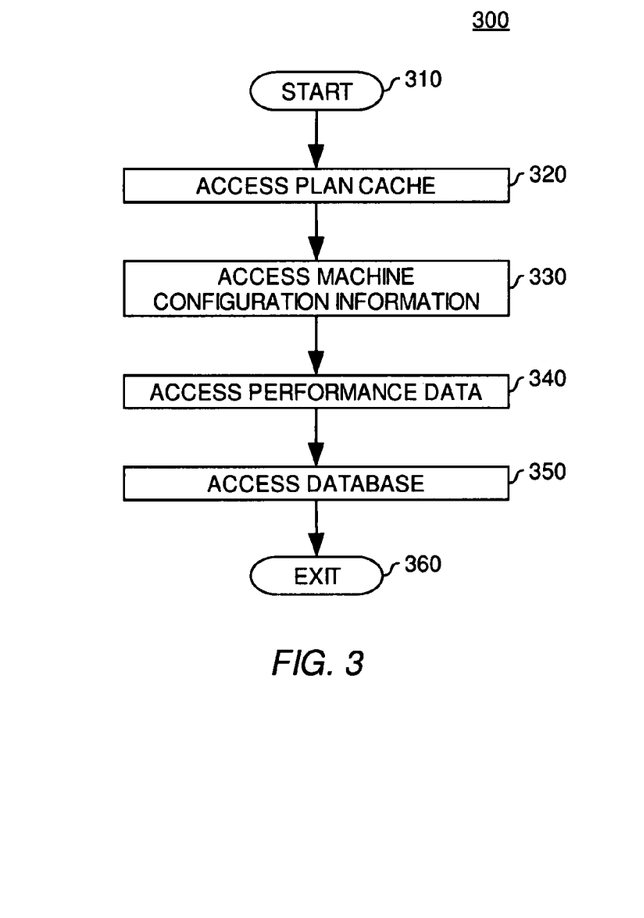
FIGS. 3-4 are flow charts illustrating migration of a database in one embodiment.

Referring now to FIG. 3, one embodiment of a method 300 for preparing migration of a database (e.g., database 216 of FIG. 2A) from a source system (e.g., source system 210 of FIG. 2A) to a target system (e.g., target system 220 of FIG. 2A) is illustrated. In one embodiment, at least part of the steps of the method 300 is performed by the detection/restoration component 230 of FIG. 2A. According to one aspect, the method 300 is performed on the source system. Method 300 starts at step 310.

At step 320, a plan cache (e.g., plan cache 212 of FIG. 2A) of the source system that is associated with the database is accessed. For instance, a corresponding address space in memory that is allocated to the plan cache is accessed in order to determine required plan cache data.

At step 330, machine configuration information (e.g., machine configuration information 214 of FIG. 2A) of the source system is accessed. For instance, suitable configuration or parameter files stored on the source system are accessed to determine required machine configuration information.

At step 340, performance data (e.g., performance data 215 of FIG. 2A) of the source system that is related to operation of the database is accessed. For instance, suitable log files or journals stored on the source system are accessed to determine required performance data.

At step 350, the database is accessed to retrieve tables and indexes (e.g., tables and indexes 218 of FIG. 2A) and associated metadata (e.g., metadata 219 of FIG. 2A) of the database. Method 300 then exits at step 360.

It should be noted that accessing and retrieving the plan cache, the machine configuration information, the performance data and the database can be performed for different purposes with respect to the migration. In one embodiment, these elements are retrieved for storage on a computer-readable medium, such as a tape or a CD-ROM. Thus, the computer-readable medium can be used to migrate these elements to the target system. Alternatively, these elements are accessed to initiate transmission to the target system via a suitable network, such as a LAN. All such different implementations are broadly contemplated.

Figure 4:
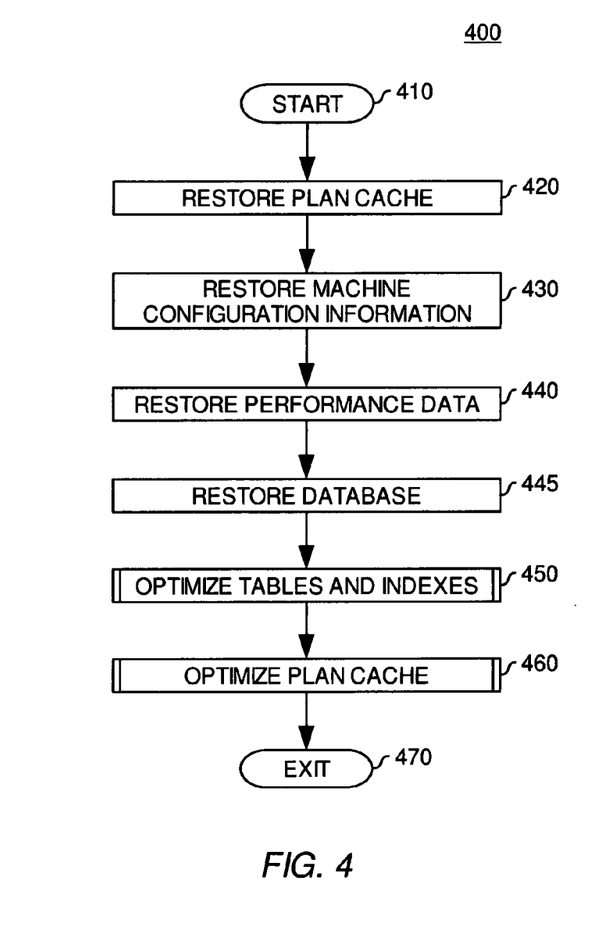

Referring now to FIG. 4, one embodiment of a method 400 for installing and configuring a database (e.g., database 216 of FIG. 2A) from a source system (e.g., source system 210 of FIG. 2A) on a target system (e.g., target system 220 of FIG. 2A) is illustrated. In one embodiment, at least part of the steps of the method 400 is performed by the detection/restoration component 230 of FIG. 2A. According to one aspect, the method 400 is performed on the target system after execution of the method 300 of FIG. 3 on the source system. Method 400 starts at step 410.

At step 420, the plan cache of the source system that was accessed at step 320 of FIG. 3 is restored on the target system. At step 430, the machine configuration information of the source system that was accessed at step 330 of FIG. 3 is restored on the target system. At step 440, the performance data of the source system that was accessed at step 340 of FIG. 3 is restored on the target system. At step 445, the database of the source system that was accessed at step 350 of FIG. 3 is restored on the target system.

At step 450, the tables and indexes and the metadata of the restored database are accessed on the target system for optimization. More specifically, in order to optimize the tables and indexes, the metadata associated with the tables and indexes is modified. Accordingly, at step 450 modified metadata (e.g., metadata 229 of FIG. 2A) is generated. Furthermore, the tables and indexes are updated to reflect the modification(s) of the metadata. This results in generation of optimized tables and indexes (e.g., optimized tables and indexes 228 of FIG. 2A) in the restored database. An exemplary method of optimizing tables and indexes of a restored database is described below with reference to FIG. 5.

At step 460, the restored plan cache is accessed on the target system for optimization. Accordingly, step 460 results in generation of an optimized plan cache (e.g., optimized plan cache 226 of FIG. 2A) on the target system. An exemplary method of optimizing a restored plan cache is described below with reference to FIG. 6. Method 400 then exits at step 470.

Figure 5:
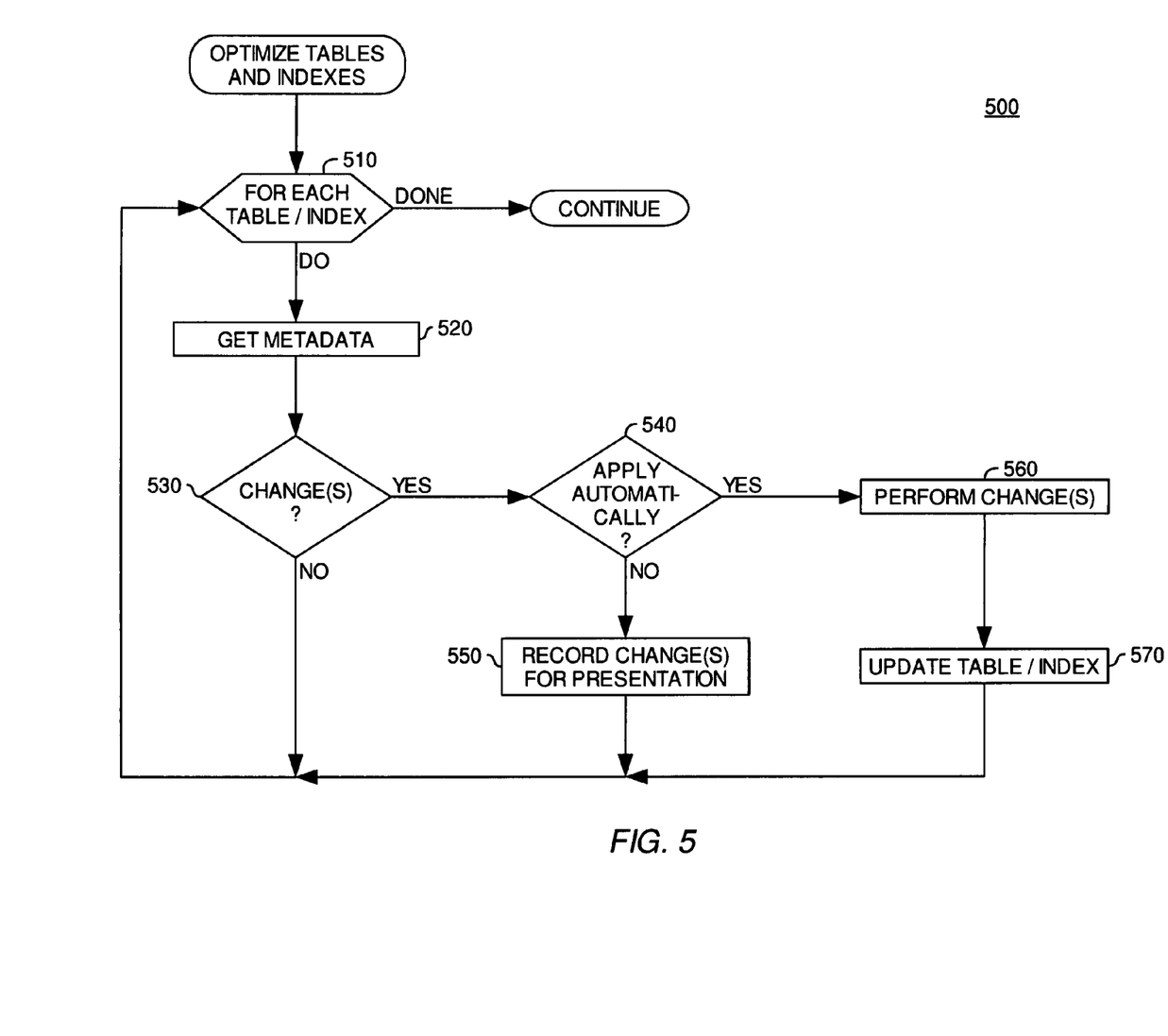
FIG. 5 is a flow chart illustrating optimization of database tables and/or indexes in one embodiment.

Referring now to FIG. 5, one embodiment of a method 500 for optimizing tables and indexes (e.g., tables and indexes 218 of FIG. 2A) of a restored database (e.g., database 216 of FIG. 2A) on a target system (e.g., target system 220 of FIG. 2A) is illustrated. In one embodiment, at least part of the steps of the method 500 is performed by the detection/restoration component 230 of FIG. 2A on the target system.

Illustratively, the method 500 is entered from step 450 of FIG. 4 and starts at step 510. At step 510, a loop consisting of steps 510 to 570 is entered for each table/index of the restored database. Assume now that the loop is initially entered at step 510 for a given table/index.

At step 520, metadata for the given table/index is retrieved from the restored database. More specifically, metadata describing layout of the given table/index and having attributes related to the given table/index, such as column descriptors, is retrieved.

At step 530, it is determined whether the retrieved metadata should be modified to optimize the given table/index. In one embodiment, the determination is performed on the basis of underlying database configuration information, such as the database configuration information that is generated at step 254 of FIG. 2B.

By way of example, assume that the retrieved metadata indicates that frequently accessed VARCHAR columns in the given table/index were allocated 50 Bytes of disk space on an underlying source system (e.g., source system 210 of FIG. 2A) having a disk space capacity of 100 GB. Assume further that the target system has a disk space capacity of 100 TB and that the underlying database configuration information recommends allocating more disk space to the VARCHAR columns, e.g., 100 Bytes. Or, assume that the underlying database configuration information recommends changing the order of the columns in the given table/index. For instance, columns at the end of the given table/index are more frequently accessed then columns at the beginning of the table/index and should, therefore, be positioned at the beginning of the given table/index. However, it should be noted that these examples are merely described by way of example and not to limit the invention. Instead, any possible recommendations for optimizing the tables and indexes are broadly contemplated.

At step 540, it is determined whether the metadata of the given table/index should be modified automatically. For instance, a suitable flag can be set in the detection/restoration component to indicate that the modifications should be performed automatically.

If the metadata should be modified automatically, processing proceeds with step 560, where the retrieved metadata is automatically modified according to the recommended change(s) indicated by the underlying database configuration information. For instance, in the given example the allocated disk space for the frequently accessed VARCHAR columns is augmented in the retrieved metadata from 50 Bytes to 100 Bytes. Then, the given table/index is updated at step 570 to reflect the modification(s) of the metadata and processing returns to step 510.

If, however, it is determined at step 540 that the retrieved metadata should not be modified automatically, processing proceeds with step 550. At step 550, the recommended change(s) indicated by the underlying database configuration information are recorded for presentation to a user, such as a database administrator, who is capable of applying the recommended changes manually. Processing then returns to step 510.

At step 510, the loop consisting of steps 510 to 570 is entered for a next table/index of the restored database. When all tables/indexes were optimized by the loop, processing continues at step 460 of the method 400 of FIG. 4.

Figure 6:
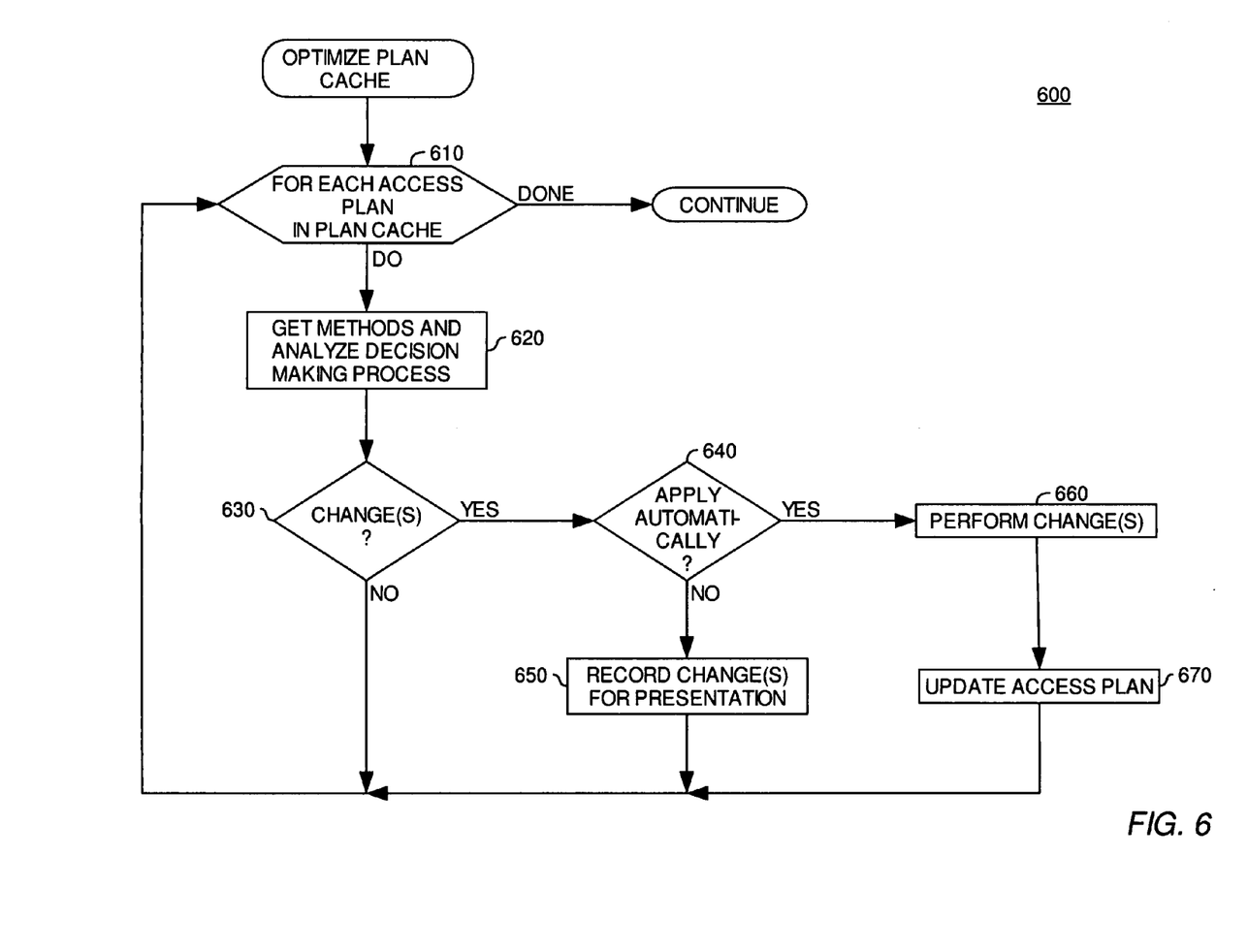
FIG. 6 is a flow chart illustrating optimization of a plan cache in one embodiment.

Referring now to FIG. 6, one embodiment of a method 600 for optimizing access plans of a restored plan cache on a target system (e.g., target system 220 of FIG. 2A) to generate an optimized plan cache (e.g., optimized plan cache 226 of FIG. 2A) is illustrated. In one embodiment, at least part of the steps of the method 600 is performed by the detection/restoration component 230 of FIG. 2A on the target system.

Illustratively, the method 600 is entered from step 460 of FIG. 4 and starts at step 610. At step 610, a loop consisting of steps 610 to 670 is entered for each access plan of the restored plan cache. Assume now that the loop is initially entered at step 610 for a given access plan.

At step 620, the given access plan is parsed to determine methods used by the access plan for query execution. Furthermore, the decision making process of the given access plan for query execution is analyzed. In other words, the given access plan is analyzed in order to determine conditions under which the access plan is used for execution of an underlying query. For instance, use of the given access plan can be required in cases where only a limited amount of memory is available for query execution.

At step 630, it is determined whether the methods and decision making process of the given access plan should be modified. In one embodiment, the determination is performed on the basis of underlying database configuration information, such as the database configuration information that is generated at step 254 of FIG. 2B.

In the given example, where the underlying source system has a disk space capacity of 100 GB and the target system has a disk space capacity of 100 TB, assume that the underlying database configuration information recommends to modify the given access plan such that query execution on the target system may use more disk space to become faster. Or, assume that the underlying source system has a 1 GHz central processing unit (CPU) and the target system has a 3 GHz CPU. Assume further that in this case the underlying database configuration information recommends modifying the access plan such that query execution may use more parallel threads and, thus, be accelerated. However, it should be noted that these examples are merely described by way of example and not to limit the invention accordingly. Instead, any possible recommendations for optimizing the access plans are broadly contemplated.

At step 640, it is determined whether the methods and/or the decision making process of the given access plan should be modified automatically. For instance, a suitable flag can be set in the detection/restoration component to indicate that the modifications should be performed automatically.

If the modifications should be performed automatically, processing proceeds with step 660, where the methods and/or the decision making process are automatically modified according to the recommended change(s) indicated by the underlying database configuration information. Then, the given access plan is updated at step 670 to reflect the modification(s) of the methods and/or the decision making process and processing returns to step 610.

If, however, it is determined at step 640 that the modifications should not be performed automatically, processing proceeds with step 650. At step 650, the recommended change(s) indicated by the underlying database configuration information are recorded for presentation to a user, such as a database administrator, who is capable of applying the recommended changes manually. Processing then returns to step 610.

At step 610, the loop consisting of steps 610 to 670 is entered for a next access plan of the restored plan cache. When all access plans were processed by the loop, processing continues at step 470 of the method 400 of FIG. 4.

In the foregoing descriptions selected examples are provided of rules that may be implemented to tune the target database. However, persons skilled in the art will recognize that any number of performance aspects of the target system may be tuned according to appropriate rules. For example, selected indexes can be added to or removed from the database, columns can be added to or removed from a selected index, other support structures such as Materialized Query Tables (MQT) or views can be added to or removed from the database and so forth. Accordingly, any performance aspect of a given target system which can be tuned according to embodiments of the invention is broadly contemplated.

While the foregoing is directed to embodiments of the present invention, other and further embodiments of the invention may be devised without departing from the basic scope thereof, and the scope thereof is determined by the claims that follow.

What is claimed is:

1. A computer-implemented method for optimizing migration of a database from a source system to a target system, comprising:

collecting source parameters related to performance characteristics for the database on the source system;

generating database configuration information on the basis of the collected source parameters and target parameters of the target system, wherein the target parameters will affect the operation of the database on the target system as compared to the operation of the database on the source system; and wherein the database configuration information is applicable to tune the database to operate on the target system; wherein the source parameters include plan cache data of the source system, the plan cache data indicating access plans for queries that were previously executed against the database on the source system; wherein generating the database configuration information comprises executing predefined rules on the collected source parameters, each rule defining a relationship between a collected source parameter and an action to be performed with respect to a corresponding target parameter to configure the database on the target system, wherein executing the predefined rules comprises comparing the collected source parameters with the target parameters and, for each comparison, determining a respective action to be performed to tune the database on the target system;

installing the database on the target system; and configuring the database to run on the target system according to the database configuration information; wherein configuring the database comprises: (i) restoring the collected source parameters, including the access plans, on the target system; and (ii) tuning the database on the target system on the basis of the restored collected source parameters; wherein tuning the database comprises:

optimizing the restored access plans for the target system based on a determined action of the database configuration information.

2. The method of claim 1, wherein the source parameters include source machine configuration information for the source system and the target parameters include target machine configuration information for the target system; wherein tuning the database comprises applying the respective actions determined by comparing the source machine configuration information with corresponding target machine configuration information during execution of the predefined rules.

3. The method of claim 1, wherein the source parameters include performance data that describes performance of the database on the source system; wherein tuning the database comprises applying the respective actions determined by comparing the source machine configuration information with corresponding target machine configuration information during execution of the predefined rules.

4. The method of claim 1, wherein configuring the database comprises:

changing at least one of (i) one or more database tables of the database, and (ii) one or more table indexes of the database.

* * * * *